(12) United States Patent
Morita

(10) Patent No.: US 11,362,876 B2
(45) Date of Patent: Jun. 14, 2022

(54) RECEIVING DEVICE AND RECEIVING METHOD, AND MOBILE TERMINAL TEST APPARATUS PROVIDED WITH RECEIVING DEVICE

(71) Applicant: ANRITSU CORPORATION, Kanagawa (JP)

(72) Inventor: Atsuki Morita, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/351,614

(22) Filed: Jun. 18, 2021

(65) Prior Publication Data
US 2021/0399938 A1 Dec. 23, 2021

(30) Foreign Application Priority Data
Jun. 23, 2020 (JP) .............................. JP2020-107689

(51) Int. Cl.
| | |
|---|---|
| H04B 3/46 | (2015.01) |
| H04B 17/00 | (2015.01) |
| H04Q 1/20 | (2006.01) |
| H04L 27/26 | (2006.01) |
| H04B 17/23 | (2015.01) |

(52) U.S. Cl.
CPC ......... *H04L 27/2663* (2013.01); *H04B 17/23* (2015.01); *H04L 27/2688* (2013.01)

(58) Field of Classification Search
CPC ............ H04L 27/2663; H04L 27/2688; H04L 27/2671; H04L 27/2678; H04B 17/23; H04B 17/364

USPC ....................................................... 375/226
See application file for complete search history.

(56) References Cited

U.S. PATENT DOCUMENTS

| | | | |
|---|---|---|---|
| 9,160,589 B1* | 10/2015 | Ramlall | H04L 27/2663 |
| 2018/0309599 A1* | 10/2018 | Lee | H04L 5/0048 |
| 2020/0304359 A1* | 9/2020 | Li | H04L 27/2662 |
| 2021/0359806 A1* | 11/2021 | Levitsky | H04W 72/0446 |

FOREIGN PATENT DOCUMENTS

JP 3768090 B2 4/2006

* cited by examiner

*Primary Examiner* — Tanmay K Shah
(74) *Attorney, Agent, or Firm* — Pearne & Gordon LLP

(57) ABSTRACT

A receiving device 100 includes a reception unit 10, a delay signal generation unit 22, a difference calculation unit 23 that calculates a phase difference between the received signal and the delay signal, a variance calculation unit 24 that calculates a variance of the phase difference within a plurality of calculation sections while sliding a set of the plurality of calculation sections which are set corresponding to a cyclic prefix group assigned to a predetermined symbol group included in the received signal, together on the time axis, a symbol detecting unit 25 that detects a position of a symbol in the symbol group on the time axis, based on the position of the minimum peak of the variance on the time axis, and a synchronization timing signal generation unit 29 that generates a synchronization timing signal, based on information on the position of the symbol on the time axis.

15 Claims, 13 Drawing Sheets

RECEIVING DEVICE AND RECEIVING METHOD, AND MOBILE TERMINAL TEST APPARATUS PROVIDED WITH RECEIVING DEVICE

TECHNICAL FIELD

The present invention relates to a receiving device and a receiving method for detecting a synchronization timing of a received signal, and a mobile terminal test apparatus provided with the receiving device.

BACKGROUND ART

In the related art, a transmission test for analyzing a signal transmitted from a Device Under Test (DUT) such as a mobile communication terminal and checking the transmission performance of the DUT has been performed using a mobile terminal test apparatus. The signal transmitted from the DUT is a modulation signal modulated according to a communication standard such as a wireless Local Area Network (LAN), Long Term Evolution (LTE), or 5G New Radio (NR).

In wideband wireless transmission systems such as wireless LAN, LTE, and 5G NR, the Orthogonal Frequency Division Multiplexing (OFDM) method having a good frequency utilization efficiency is widely used as the modulation method. The OFDM method is a block transmission method that synchronizes every predetermined data block. Specifically, the data string is demultiplexed on the transmitting side, converted into parallel data, mapped to each subcarrier, and then an Inverse Fast Fourier Transform (IFFT) process, D/A transformation, orthogonal modulation, or the like are performed to obtain a transmission signal. In addition, after conversion to a signal in the time domain by IFFT process, a part of the rear end of the signal is added to the front of the signal as a guard interval (referred to as a cyclic prefix (CP)) to make it resistant to inter-symbol interference due to multipath fading. Such a guard interval is also referred to as a Cyclic Prefix (CP).

The mobile terminal test apparatus receives and demodulates the modulation signal generated in this manner, and performs signal analysis, and it is necessary to accurately perform demodulation in order to perform highly accurate analysis. For that purpose, it is necessary to accurately estimate the start position of a data block such as a symbol, a slot, or a frame included in the received signal. As an apparatus that synchronizes a received signal, for example, the data transmission apparatus described in Patent Document 1 is known.

Patent Document 1 describes a configuration in which a data string to be compared in an input signal is sequentially shifted on the time axis, a correlation process is performed with a reference data string, the peak of a correlation value is detected, and the start position of the frame is detected based on the position of the correlation peak.

RELATED ART DOCUMENT

Patent Document

[Patent Document 1] Japanese Patent No. 3768090

DISCLOSURE OF THE INVENTION

Problem that the Invention is to Solve

However, in an apparatus described in Patent Document 1 in the related art, a synchronization timing is detected based on the correlation between the waveforms of a received data string and a reference data string. However, when only the peak of the correlation value is used as a basis, a position other than the end of a symbol may be mistakenly detected as the end of a symbol due to the influence of noise or the like.

The present invention has been made to solve the above-mentioned problems in the related art, and a purpose thereof is to provide a receiving device and a receiving method capable of accurately detecting the synchronization timing of a received signal, and a mobile terminal test apparatus provided with the receiving device.

Means for Solving the Problem

In order to achieve the above object, a receiving device of the present invention includes: a reception unit (10) that acquires a received signal by receiving and sampling a modulation signal modulated by an OFDM method; a delay signal generation unit (22) that generates a delay signal by delaying the received signal by a valid data length of one symbol on a time axis; a difference calculation unit (23) that calculates a difference value of physical quantity between the received signal and the delay signal at each sample point on the time axis; a variance calculation unit (24) that calculates a variance of the difference value within a plurality of calculation sections while sliding a set of the plurality of calculation sections, which are set corresponding to a cyclic prefix group assigned to a predetermined symbol group included in the received signal, together on the time axis; a symbol detecting unit (25) that detects a position of a symbol in the symbol group on the time axis, based on the position of the minimum peak of the variance on the time axis; and a synchronization timing signal generation unit (29) that generates a synchronization timing signal, based on information on the position of the symbol on the time axis.

As described above, in the receiving device of the present invention, the delay signal generation unit generates a delay signal by delaying the received signal provided with the cyclic prefix (CP) at the beginning of each symbol, by a valid data length of one symbol on a time axis. The CP of each symbol of the received signal is a copy of the symbol tail portion (CP'). Therefore, the physical quantity difference value such as a phase difference, an amplitude difference, and a power difference between the received signal and the delay signal becomes zero in a section of the symbol tail portion CP' of the received signal on the time axis, and in the section, the variance of the difference value of physical quantity between both signals is to be minimal. Therefore, in the present invention, the position of the symbol is specified by detecting the CP' section in which the variance of the difference value of physical quantity between the received signal and the delay signal is minimal, and the timing signal for synchronization is generated.

Specifically, the variance calculation unit calculates the variance of the difference value within the plurality of calculation sections while sliding the set of the plurality of calculation sections together on the time axis. The plurality of calculation sections included in one set are set corresponding to the CP group assigned to the predetermined symbol group included in the received signal. For example, each calculation section has the same time length as the time length of the corresponding CP, and the interval between two adjacent calculation sections is equal to the interval between the corresponding adjacent CPs. By calculating the variance of the difference value in a set of a plurality of calculation sections in this way, even when the number of resource blocks in the symbol is small, the minimum peak of the variance appears more clearly. Thus, the position of each symbol of the received signal on the time axis can be detected accurately, and thus the synchronization timing of the received signal can be detected accurately. Further, since the variance of the difference value is calculated only in the calculation section of the time length corresponding to each CP, and the variance of the difference value is not calculated in a section between the calculation section and the calculation section (non-calculation section), the calculation amount can be suppressed.

Further, in the receiving device of the present invention, at least one symbol of the symbol group may have a cyclic prefix having a longer time length than cyclic prefixes of the other symbols of the symbol group, a calculation section corresponding to the cyclic prefix having the longer time length may have a section length longer than the other calculation sections among the plurality of calculation sections, the symbol detecting unit may detect a position of a first symbol of the symbol group on the time axis, based on a position of the minimum peak of the variance on the time axis, and the synchronization timing signal generation unit may generate the synchronization timing signal, based on information on the position of the first symbol on the time axis.

With this configuration, a set of a plurality of calculation sections is configured to include a calculation section (long calculation section) corresponding to a relatively long time length CP (long CP) and a calculation section (short calculation section) corresponding to a relatively short time length CP (short CP). Thus, only when the long calculation section corresponds to the relatively long symbol tail portion (long CP') and the short calculation section corresponds to the relatively short symbol tail portion (short CP'), the variance of the difference value is minimized. Thus, the receiving device of the present invention can reliably detect the first symbol of the symbol group.

Further, the receiving device of the present invention may have a configuration to include an adjusting unit (26) that calculates a likelihood that in a time range of a predetermined length including a calculation start point of the plurality of calculation sections on the time axis when the variance is minimal, a position of the first symbol determined from a selected sample point is an actual position of the first symbol in the received signal, based on a known reference signal in the received signal, and estimates the position of the first symbol from a sample point when the likelihood is maximum.

With this configuration, the receiving device of the present invention can estimate a more likely position of the first symbol around the position on the time axis of the first symbol detected by the symbol detecting unit. At that time, the accuracy of estimation is improved by making a determination based on a known reference signal in the received signal. For example, the adjusting unit may calculate a correlation value between the data on the signal portion corresponding to the reference signal in the received signal when it is assumed that the sample point selected within the time range is the position of the first symbol in the slot, and the data on an actual reference signal, and estimate the position of the first symbol, from the sample point when the correlation value is the maximum. In this way, the position of the first symbol can be detected more finely by obtaining the position of the first symbol on the time axis in two steps by different methods, whereby the synchronization timing of the received signal can be detected accurately.

Further, the receiving device of the present invention may have a configuration to include a first symbol candidate detecting unit (251) that detects a calculation start point of the plurality of calculation sections on the time axis when the variance is smaller than a predetermined reference value, as a first symbol candidate point; and a candidate narrowing unit (252) that calculates a likelihood that a position of the first symbol determined from the first symbol candidate point is an actual position of the first symbol in the received signal, based on a known reference signal in the received signal, and estimates the position of the first symbol from the first symbol candidate point when the likelihood is maximum.

With this configuration, the receiving device of the present invention can estimate the more likely position of the first symbol, among the first symbol candidate points detected by the first symbol candidate detecting unit. At that time, the accuracy of estimation is improved by making a determination based on a known reference signal in the received signal. For example, the candidate narrowing unit may calculate a correlation value between the data on the signal portion corresponding to the reference signal in the received signal when it is assumed that the first symbol candidate point is the position of the first symbol in the slot, and the data on the actual reference signal, and estimate the position of the first symbol, from the first symbol candidate point when the correlation value is the maximum. In this way, the position of the first symbol can be detected more finely by obtaining the position of the first symbol on the time axis in two steps by different methods, whereby the synchronization timing of the received signal can be detected accurately.

Further, in the receiving device of the present invention, each calculation section may have a time length shorter than a time length of the corresponding cyclic prefix.

In general, in the symbol tail portion CP' of the received signal corresponding to the CP of the delay signal, the difference value tends to be unstable at both ends thereof, which is particularly remarkable when the resource block (RB) is small. In the receiving device of the present invention, when the calculation section matches CP', at least one of both ends of CP' can be excluded from the calculation section, so that the peak of variance becomes clearer, and therefore, the position of the first symbol can be detected more accurately. Thus, even when the number of resource blocks is small, the synchronization timing of the received signal can be detected accurately.

Further, the mobile terminal test apparatus of the present invention includes any of the above receiving devices (100) that receive a modulation signal modulated by an OFDM method from a mobile communication terminal (2) and generate a synchronization timing signal; a demodulation unit (30) that demodulates the received signal, based on the synchronization timing signal, and outputs a demodulation signal (f); an analysis unit (40) that analyzes the demodulation signal; and a display unit (50) that displays a result of analysis by the analysis unit.

With this configuration, the mobile terminal test apparatus of the present invention can accurately detect the synchronization timing of the received signal, thereby performing demodulation and subsequent analysis of the signal accurately.

Further, in the mobile terminal test apparatus of the present invention, the physical quantity may be a phase, when calculating a variance of a phase difference within the plurality of calculation sections, the variance calculation unit may calculate an average value of the phase difference within the plurality of calculation sections, and calculate a frequency error of the received signal from an average value of the phase difference when the variance indicates the minimum peak, and the display unit may display information on the frequency error.

With this configuration, the mobile terminal test apparatus of the present invention can accurately detect the synchronization timing of the received signal and also acquire the frequency error information.

Further, a signal analysis method of the present invention includes: a reception step (S1 to S3) of acquiring a received signal by receiving and sampling a modulation signal modulated by an OFDM method; a delay signal generation step (S4) of generating a delay signal by delaying the received signal by a valid data length of one symbol on a time axis; a difference calculation step (S5) of calculating a difference value of physical quantity between the received signal and the delay signal at each sample point on the time axis; a variance calculation step (S6) of calculating a variance of the difference value within a plurality of calculation sections while sliding a set of the plurality of calculation sections which are set corresponding to a cyclic prefix group assigned to a predetermined symbol group included in the received signal, together on the time axis; a symbol detection step (S7) of detecting a position of each symbol in the symbol group on the time axis, based on the position of the minimum peak of the variance on the time axis; and a synchronization timing signal generation step (S9) of generating a synchronization timing signal, based on information on the position of the each symbol on the time axis.

As described above, in the receiving method of the present invention, in the delay signal generation step, a delay signal is generated by delaying the received signal provided with the cyclic prefix (CP) at the beginning of each symbol, by a valid data length of one symbol on a time axis. As described above, the CP of each symbol of the received signal is a copy of the symbol tail portion (CP'). Therefore, the physical quantity difference value such as a phase difference, an amplitude difference, and a power difference between the received signal and the delay signal becomes zero in a section of the symbol tail portion CP' of the received signal on the time axis, and in the section, the variance of the difference value of physical quantity between both signals is to be minimal. Therefore, in the present invention, the position of the symbol is specified by detecting the CP' section in which the variance of the difference value of physical quantity between the received signal and the delay signal is minimal, and the timing signal for synchronization is generated.

Specifically, in the variance calculation step, the variance of the difference value within the plurality of calculation sections is calculated while sliding the set of the plurality of calculation sections together on the time axis. The plurality of calculation sections included in one set are set corresponding to the CP group assigned to the predetermined symbol group included in the received signal. For example, each calculation section has the same time length as the time length of the corresponding CP, and the interval between two adjacent calculation sections is equal to the interval between the corresponding adjacent CPs. By calculating the variance of the difference value in a set of a plurality of calculation sections in this way, even when the number of resource blocks in the symbol is small, the minimum peak of the variance appears more clearly. Thus, in the symbol detection step, the position of each symbol of the received signal on the time axis can be detected accurately, and thus the synchronization timing of the received signal can be detected accurately. Further, since the variance of the difference value is calculated only in the calculation section of the time length corresponding to each CP, and the variance of the difference value is not calculated in a section between the calculation section and the calculation section (non-calculation section), the calculation amount can be suppressed.

Advantage of the Invention

According to the present invention, it is possible to provide a receiving device and a receiving method capable of accurately detecting the synchronization timing of a received signal, and a mobile terminal test apparatus provided with the receiving device.

BEST MODE FOR CARRYING OUT THE INVENTION

Hereinafter, embodiments of the present invention will be described with reference to the drawings.

First Embodiment

Figure 1:
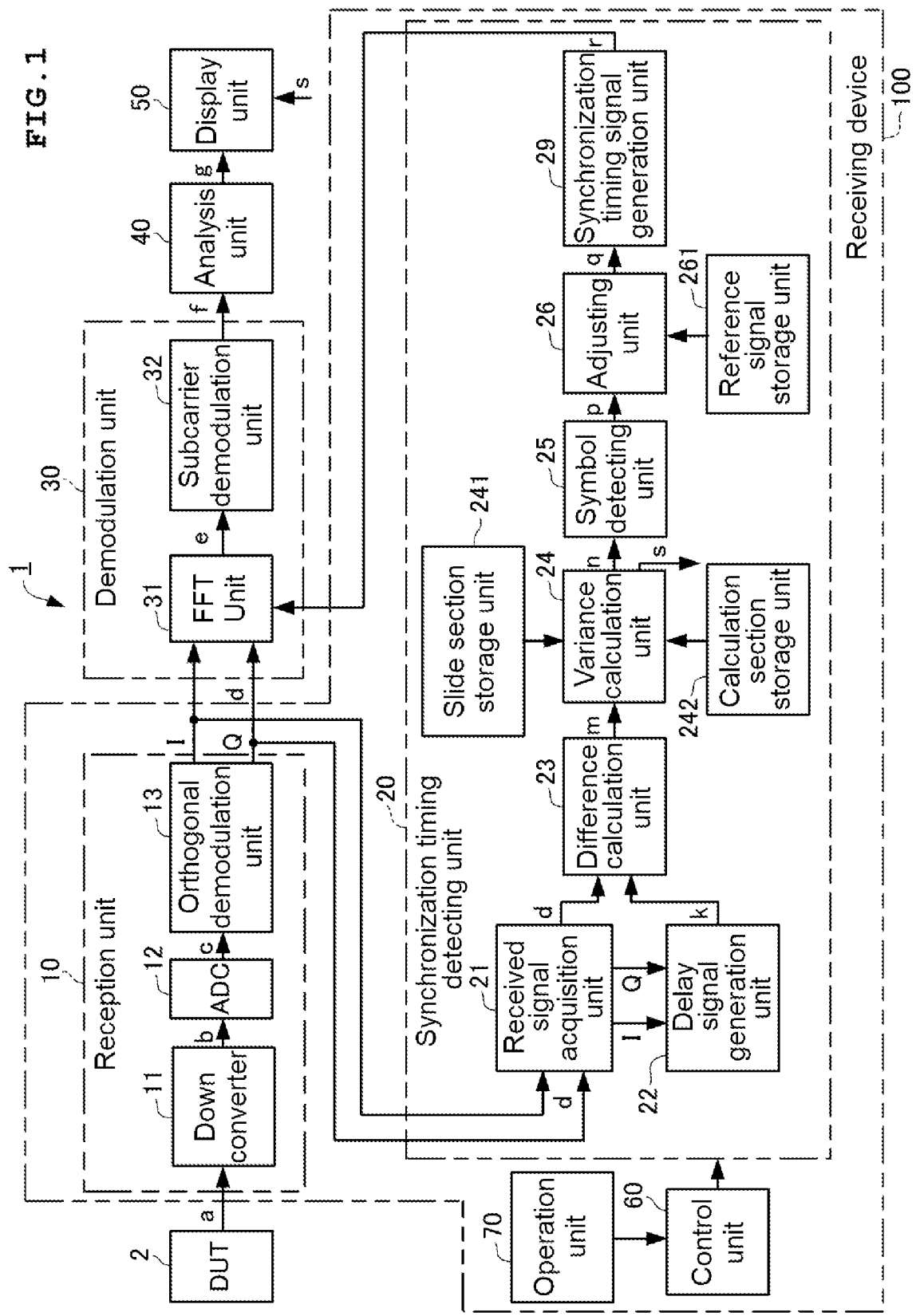
FIG. 1 is a block diagram illustrating a configuration of a mobile terminal test apparatus according to a first embodiment of the present invention.

As illustrated in FIG. 1, a mobile terminal test apparatus 1 according to a first embodiment of the present invention is configured to receive and analyze a modulation signal a transmitted from a device under test (DUT) 2 and test the transmission performance of the DUT 2, and includes a reception unit 10, a synchronization timing detecting unit 20, a demodulation unit 30, an analysis unit 40, a display unit 50, a control unit 60, and an operation unit 70. Examples of the DUT 2 include, but are not limited to, mobile communication terminals such as smartphones, mobile phones, and tablet terminals. The modulation signal a transmitted from the DUT 2 is an OFDM modulation signal modulated by, for example, an orthogonal frequency division multiplexing (OFDM) method according to a communication standard such as LTE or 5G NR. Hereinafter, each component will be described.

(Reception Unit)

The reception unit 10 receives the modulation signal a (OFDM modulation signal) transmitted from the DUT 2 via an antenna or by wire, and includes a down converter 11, an analog-to-digital converter (ADC) 12, and an orthogonal demodulation unit 13.

The down converter 11 includes a mixer and a local oscillator, inputs the modulation signal a transmitted from the DUT 2 and the local signal generated by the local oscillator to the mixer, down-converts the input signals, and generates an intermediate frequency (IF) signal b. The intermediate frequency signal b is sent to the ADC 12.

The ADC 12 samples the intermediate frequency signal b, which is frequency-converted by the down converter 11, and converts the sampled intermediate frequency signal b from an analog signal to a digital signal. An obtained digital intermediate frequency signal c is sent to the orthogonal demodulation unit 13.

The orthogonal demodulation unit 13 frequency-converts the digital intermediate frequency signal c output from the ADC 12 into a baseband signal, and orthogonally demodulates it into an I-phase component and a Q-phase component. An obtained orthogonal demodulation signal d is sent to the synchronization timing detecting unit 20 and the demodulation unit 30. The orthogonal demodulation signal d is a complex signal.

In the above, in the reception unit 10, the modulation signal is converted into an intermediate frequency signal by the down converter 11, but may be converted into a baseband signal by the down converter 11.

As will be described in detail later, the synchronization timing detecting unit 20 detects the first symbol in the symbol group (slot) included in the orthogonal demodulation signal d output from the orthogonal demodulation unit 13, and generates a timing signal required for the synchronization process.

(Demodulation Unit)

The demodulation unit 30 OFDM-demodulates the orthogonal demodulation signal d output from the orthogonal demodulation unit 13 of the reception unit 10, and includes a fast Fourier transform (FFT) unit 31 and a subcarrier demodulation unit 32.

The FFT unit 31 performs a fast Fourier transform process on the orthogonal demodulation signal d output from the orthogonal demodulation unit 13 at a timing based on the synchronization timing signal r sent from the synchronization timing detecting unit 20 to generate a frequency domain signal e. Before the FFT process is performed by the FFT unit 31, CP is removed from each symbol of the orthogonal demodulation signal d. The generated frequency domain signal e is sent to the subcarrier demodulation unit 32.

A transmission line estimation/correction unit may be provided between the FFT unit 31 and the subcarrier demodulation unit 32. The transmission line estimation/correction unit corrects the transmission line by estimating the transmission line using, for example, a pilot signal, with respect to the frequency domain signal e output from the FFT unit 31. When the transmission line estimation/correction unit is provided, the corrected frequency domain signal is sent to the subcarrier demodulation unit 32.

The subcarrier demodulation unit 32 performs a demodulation process on the frequency domain signal e for each subcarrier to generate an OFDM demodulation signal f. The OFDM demodulation signal f is sent to the analysis unit 40.

(Analysis unit/Display Unit)

The analysis unit 40 is configured to measure and analyze, for example, transmission power, Error Vector Magnitude (EVM), constellation, spectrum, or the like, with respect to the OFDM demodulation signal f output from the subcarrier demodulation unit 32, and test the transmission performance of the DUT 2. The measurement and analysis result by the analysis unit 40 is sent to the display unit 50.

The display unit 50 displays, on a liquid crystal display or the like, the test result of the DUT 2, including data and graphs of the measurement and analysis result sent from the analysis unit 40.

(Data Structure)

Here, an example of the data structure of the orthogonal demodulation signal d (hereinafter, also referred to as "received signal") output from the reception unit 10 will be described.

For example, the received signal d is composed of a plurality of consecutive frames when viewed in a time axis direction, and one frame is composed of 10 subframes. The time length of one subframe is 1 ms, so the time length of one frame is 10 ms. The subframe is composed of one or a plurality of slots, and the number of slots included in one subframe is determined according to the subcarrier interval. One slot contains, for example, 14 symbols.

Seen in the frequency direction, the received signal d is composed of a plurality of resource blocks, and one resource block includes, for example, 12 consecutive subcarriers.

Figure 2:
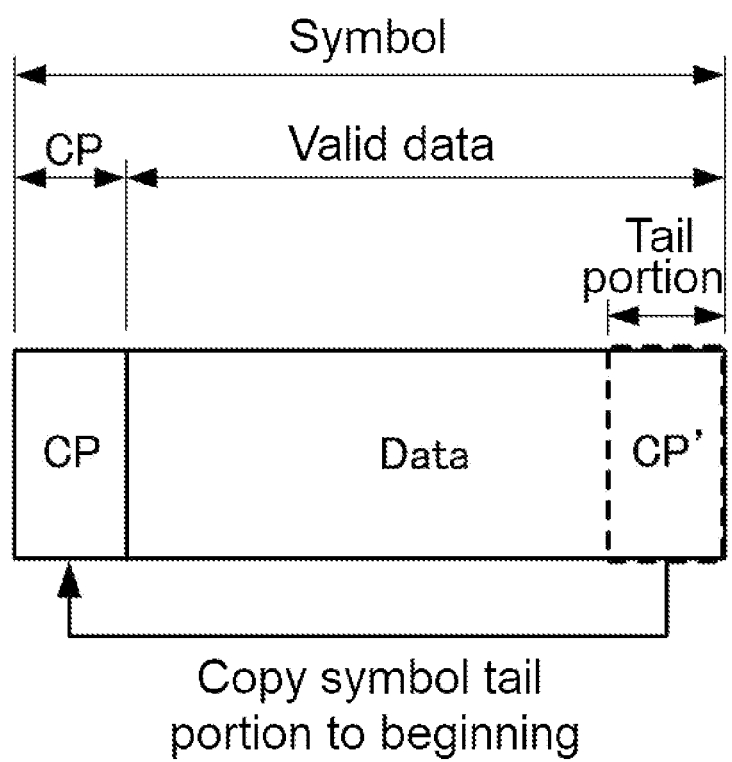
FIG. 2 is a diagram illustrating a configuration of a symbol.

As illustrated in FIG. 2, one symbol is composed of a cyclic prefix (CP) section arranged at the beginning and a valid data section following the section. The CP is a guard interval for reducing inter-symbol interference caused by multipath, and is a copy of a symbol tail portion (CP'). The CP includes a short CP having a relatively short section length (also referred to as a normal CP) and a long CP having a relatively long section length, and the arrangement thereof is determined according to a communication standard. In the present embodiment, as an example, the CPs of the first and fourth symbols in the slot are described as long CPs, and the CPs of the other symbols are described as short CPs.

(Synchronization Timing Detecting Unit)

Next, the synchronization timing detecting unit 20 will be described.

The synchronization timing detecting unit 20 detects the synchronization timing of the received signal d output from the reception unit 10, and specifically, detects the symbol, particularly, the first symbol, of the symbol group included in the received signal d, and generates a timing signal required for synchronization. For this purpose, the synchronization timing detecting unit 20 includes a received signal acquisition unit 21, a delay signal generation unit 22, a difference calculation unit 23, a variance calculation unit 24, a slide section storage unit 241, a calculation section storage unit 242, a symbol detecting unit 25, an adjusting unit 26, a reference signal storage unit 261, and a synchronization timing signal generation unit 29. Hereinafter, each component will be described.

The received signal acquisition unit 21 acquires the received signal d from the orthogonal demodulation unit 13 of the reception unit 10 and stores the data. The received signal d is a time-series complex signal, and has an I-phase component and a Q-phase component. Assuming that the number of samples per slot containing 14 symbols (symbol group) is N, the received signal acquisition unit 21 stores the sample data of an I-phase component and a Q-phase component per one slot.

I-phase component: $I_1, I_2, \ldots, I_N$ (1)

Q-phase component: $Q_1, Q_2, \ldots, Q_N$ (2)

The number of samples N varies depending on the measurement conditions, but for example, 14640, 30720, 61440 and the like are adopted.

The received signal acquisition unit 21 may store data for two slots (that is, 28 symbols), or may store data for three or more slots.

The delay signal generation unit 22 generates a delay signal k by delaying the received signal d having a CP at the beginning of each symbol by the valid data length of one symbol on the time axis.

Figure 3:
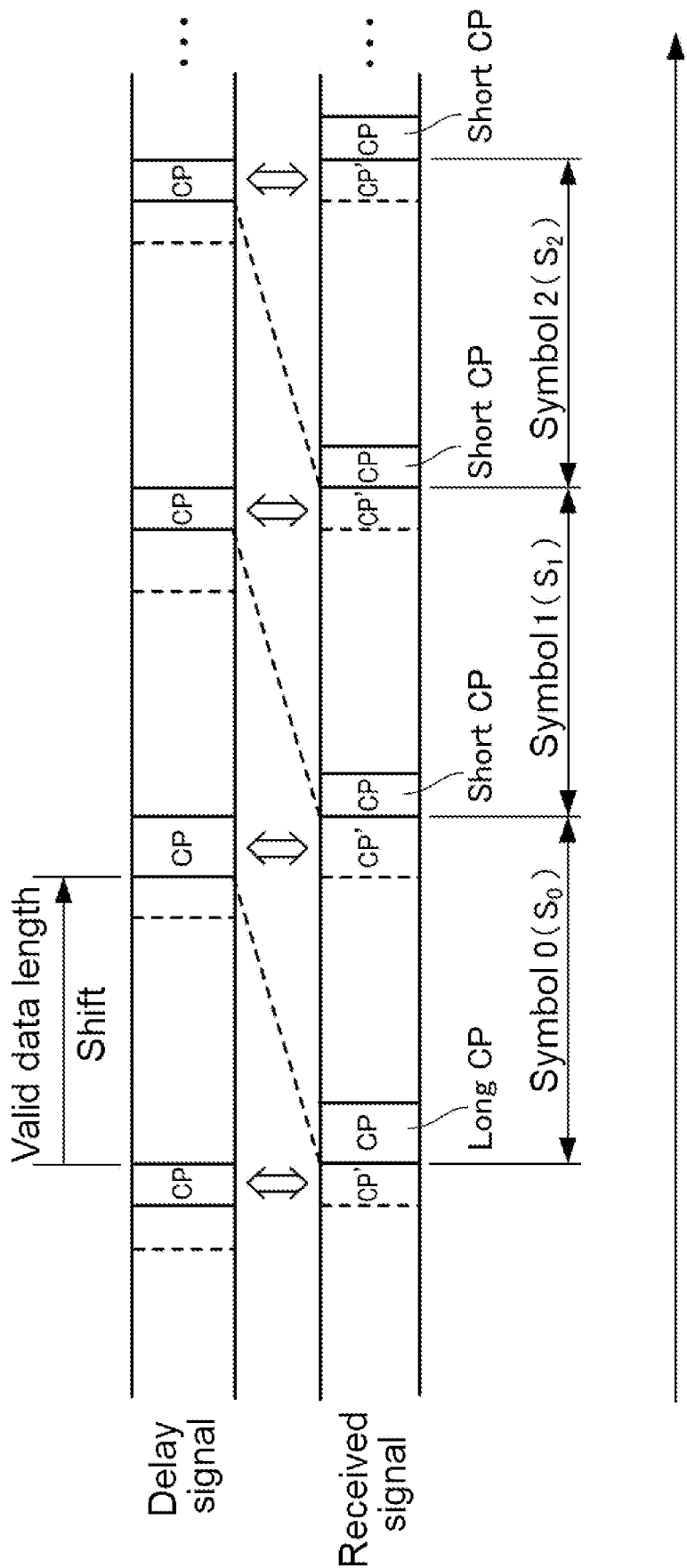
FIG. 3 is a diagram illustrating a configuration of a received signal and a delay signal.

Specifically, as illustrated in FIG. 3, the CP at the beginning of each symbol of the delay signal k corresponds to the tail portion CP' of the corresponding symbol in the received signal d on the time axis. Therefore, the CP of each symbol of the delay signal k and the tail portion CP' of the received signal d corresponding to the CP on the time axis are to be originally the same signal.

More specifically, the delay signal k is as follows for one slot.

I-phase component: $I_{-M+1}, \ldots, I_1, I_2, \ldots, I_{N-M}$ (3)

Q-phase component: $Q_{-M+1}, \ldots, Q_1, Q_2, \ldots, Q_{N-M}$ (4)

Here, M is the number of samples corresponding to the valid data length of one symbol.

The difference calculation unit 23 calculates a predetermined difference value of physical quantity between the received signal d stored in the received signal acquisition unit 21 and the delay signal k generated by the delay signal generation unit 22 at each sample point on the time axis, and generates a difference data string consisting of difference values.

Examples of the physical quantity include, but are not limited to, a phase, an amplitude, and power. Examples of the difference value of physical quantity between both signals include a phase difference, an amplitude difference, and a power difference. The physical quantity may be another physical quantity such as a moving average determined at each sample point of the received signal. In the following, for the sake of explanation, it will be described that the physical quantity is a phase.

The phase $\psi_n$ at the time of the n-th sample n (n is an integer) of the received signal d is expressed by the following equation from the I-phase component In and the Q-phase component $Q_n$.

$\psi_n = \tan^{-1}(Q_n/I_n)$ (5)

The phase $\varphi_n$ at the time of the n-th sample n of the delay signal k is expressed by the following equation from the I-phase component $I_{n-M}$ and the Q-phase component $Q_{n-M}$ delayed by the M samples corresponding to the valid data length.

$\varphi_n = \tan^{-1}(Q_{n-M}/I_{n-M})$ (6)

Therefore, the phase difference $\Delta\Theta_n$ at the time of the n-th sample n is expressed by the following equation.

$\Delta\Theta_n = \psi_n - \varphi_n = \tan^{-1}(Q_n/I_n) - \tan^{-1}(Q_{n-M}/I_{n-M})$ (7)

Figure 4:
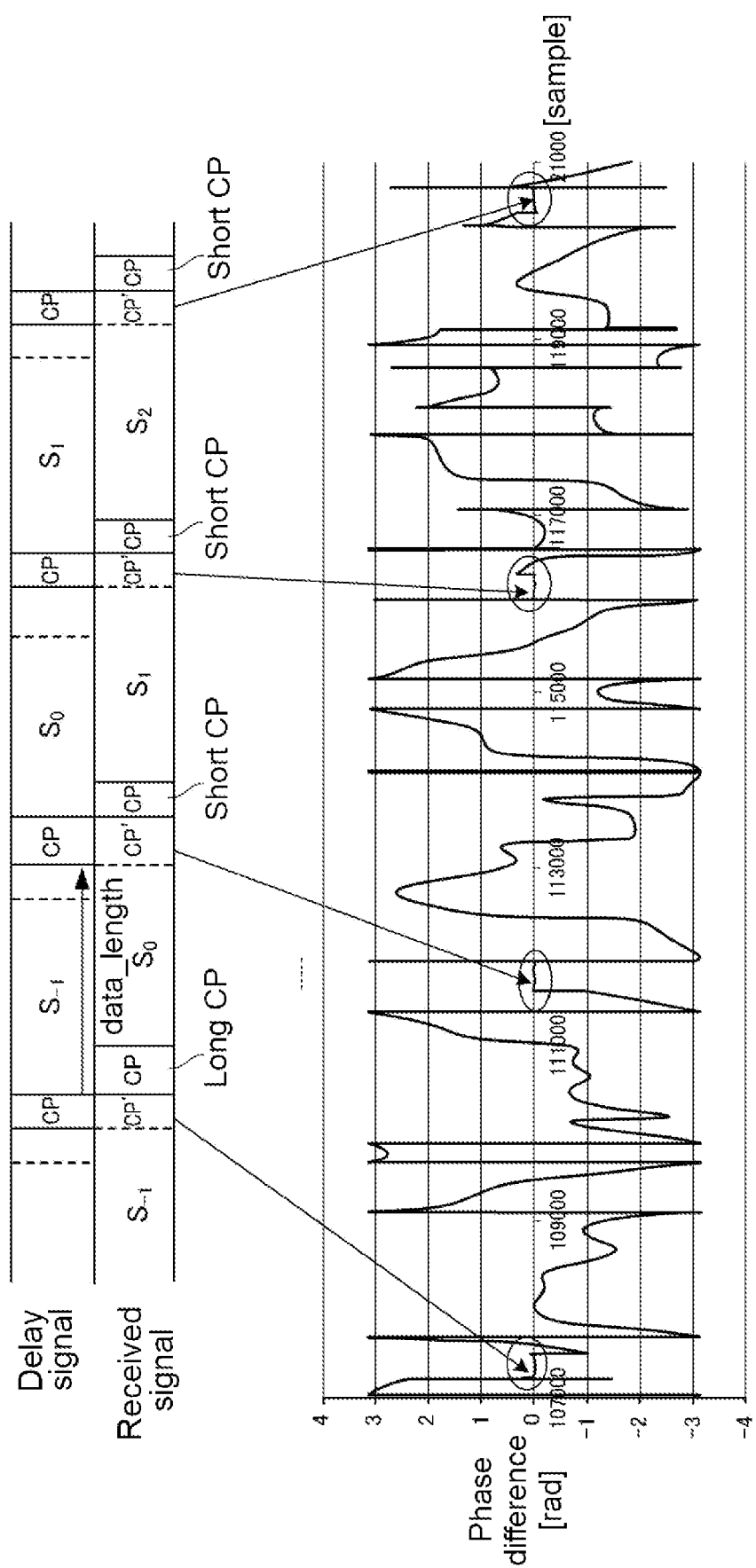
FIG. 4 is a diagram illustrating a phase difference between the received signal and the delay signal.

FIG. 4 illustrates a graph of the phase difference data string m including the phase difference between the received signal d and the delay signal k. As illustrated in FIG. 4, the CP section of the delay signal k and the tail portion CP' of the received signal d, which is the copy source of the CP section, are arranged so as to correspond to each other on the time axis. Hereinafter, this section in the received signal is referred to as a "CP' section". Therefore, in the graph of the phase difference data string m, the phase difference is almost zero in the CP' section, and the graph of the phase difference data string m is flat in this CP' section. That is, it is expected that the variance of the phase difference in the CP' section is smaller than the variance of the phase difference outside the CP' section. In the present embodiment, the symbol in the slot is specified by utilizing this feature.

Figure 5:
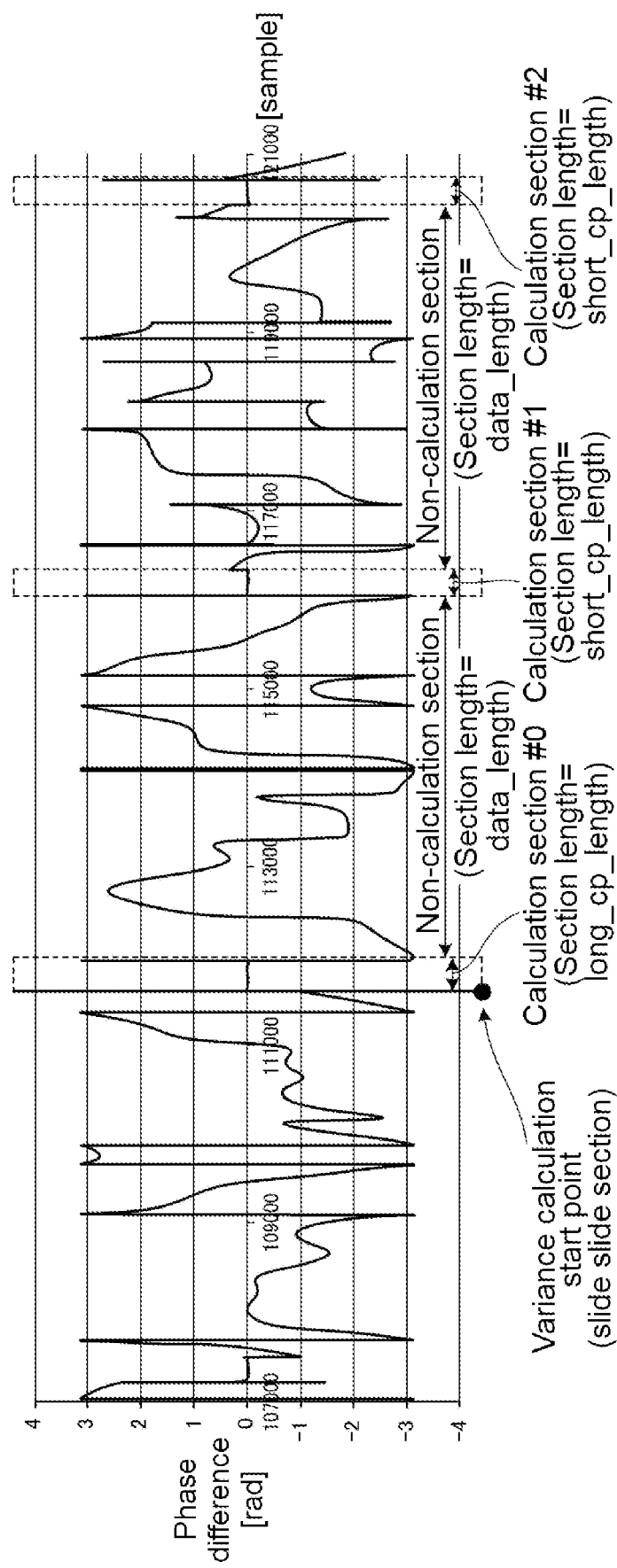
FIG. 5 is a diagram illustrating a calculation section for calculating variance.

While sliding the set of the plurality of calculation sections which are set corresponding to a cyclic prefix group assigned to a predetermined symbol group (hereinafter, also referred to as a slot) included in the received signal d, together on the time axis, the variance calculation unit 24 calculates the variance of the difference value within the plurality of calculation sections. As illustrated in FIG. 5, each of the plurality of calculation sections slid in a set has a time length corresponding to the time length of the corresponding CP in the slot, and the interval between the adjacent calculation sections is equal to the interval between the adjacent corresponding CPs.

For the sake of explanation, it is assumed here that the symbol group (slot) includes 14 symbols including symbol 0, symbol 1, ..., and symbol 13. The CP of the symbol n is expressed by $CP_n$ ($0 \leq n \leq 13$). Similarly, in the calculation section set corresponding to the CP, one set of calculation sections is composed of calculation section 0, calculation section 1, ..., and calculation section 13. For example, the section length of the calculation section n is equal to the time length of $CP_n$ of the symbol n. The section between adjacent CPs is a non-calculation section and is equal to the valid data length. In the calculation section 0 corresponding to $CP_0$ of the first symbol 0 (also referred to as "first symbol") in the slot, the start point of the section is referred to as a "calculation start point".

The calculation section is set such that when the calculation start point coincides with the start point of the tail portion CP' of the first symbol, the calculation section 0, the calculation section 1, ..., and the calculation section 13 match the CP' sections of the symbol 0, the symbol 1, ..., and the symbol 13.

The CP included in one slot includes a short CP with a relatively short section length (also referred to as a normal CP) and a long CP with a relatively long section length, and the CP arrangement in the slot is determined in advance according to the communication standard. Therefore, at least one symbol in the slot has a long CP having a longer time length than the CPs of the other symbols in the slot, and the calculation section corresponding to this long CP has a section length longer than the other calculation sections. In this way, since calculation sections with different section lengths are mixed, it is possible to accurately specify the first symbol.

Figure 6:
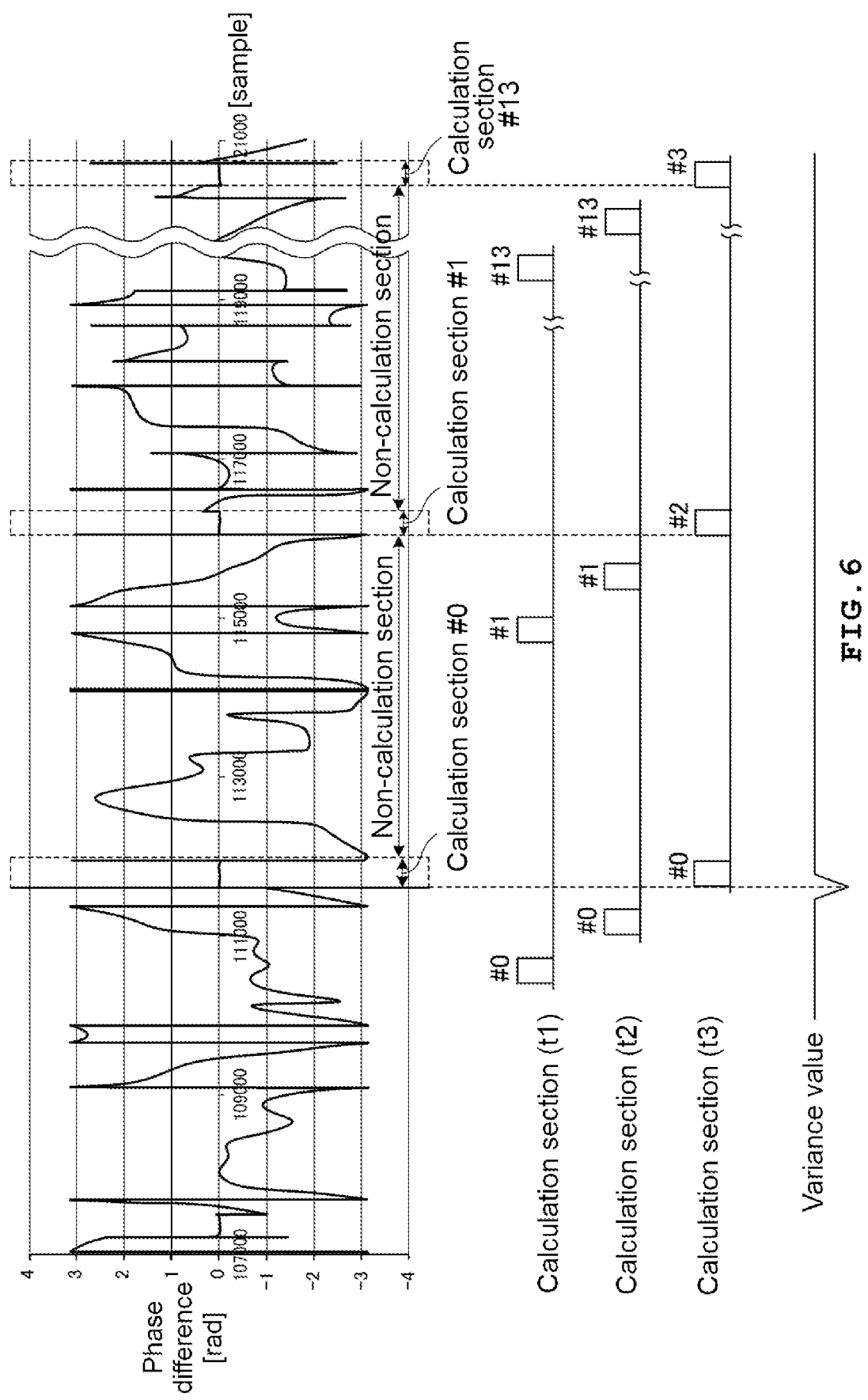
FIG. 6 is a diagram illustrating a state of sliding in a calculation section.

FIG. 6 is a diagram illustrating a state of sliding of the calculation section. The variance calculation unit 24 calculates the variance $\sigma_2$ of the phase difference in one set of calculation sections by the following equation every time the one set of calculation section 0, calculation section 1, ..., calculation section 13 are slid by, for example, one sample on the time axis.

$\sigma^2 = (1/m)\Sigma_{i=1}^{m}(x_i - \mu)^2$ (8)

Figure 7:
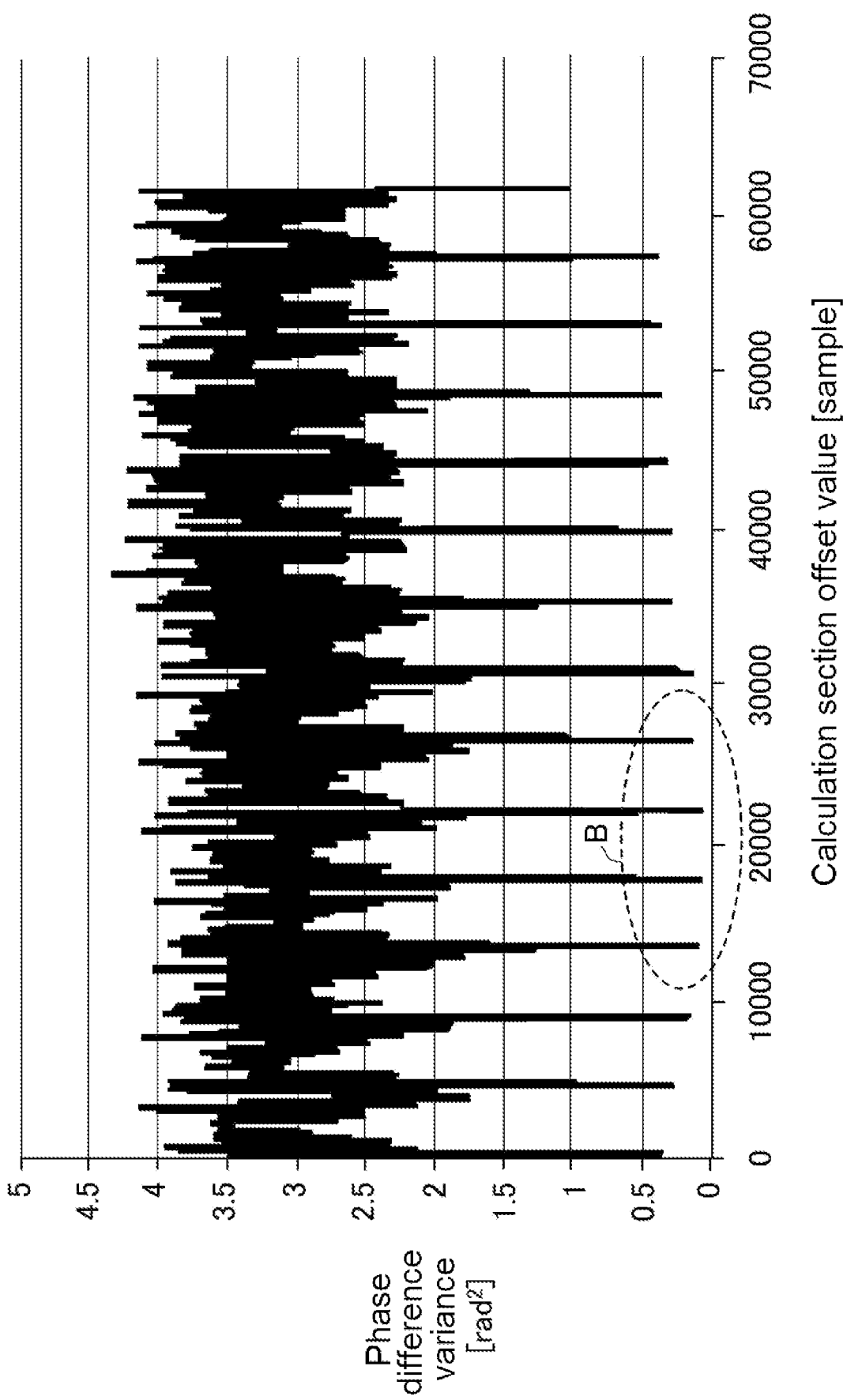
FIG. 7 is a graph illustrating the movement variance of a phase difference.

Here, m is the number of samples included in one set of calculation sections, $x_i$ is the phase difference in the i-th sample i, and $\mu$ is the average value of the phase differences in one set of calculation sections. $\Sigma$ is the sum of i=1 to m. The variance $\sigma_2$ of the phase difference may be an unbiased variance. In FIG. 6, the state in which the minimum peak of the variance value of the phase difference is formed at time t3 is illustrated in a simplified manner. The actual waveform of the variance value of the phase difference is as illustrated in FIG. 7.

From the average value p of the phase difference in one set of calculation sections, the frequency error of the received signal can be calculated by the following equation.

$$\text{Frequency error} = (\mu/2\pi) \times SCS \qquad (9)$$

Here, SCS is a subcarrier interval. The calculated frequency error information s calculated by the variance calculation unit 24 may be displayed on the display unit 50, or the frequency error of the received signal may be corrected based on the calculated frequency error information s.

Figure 10:
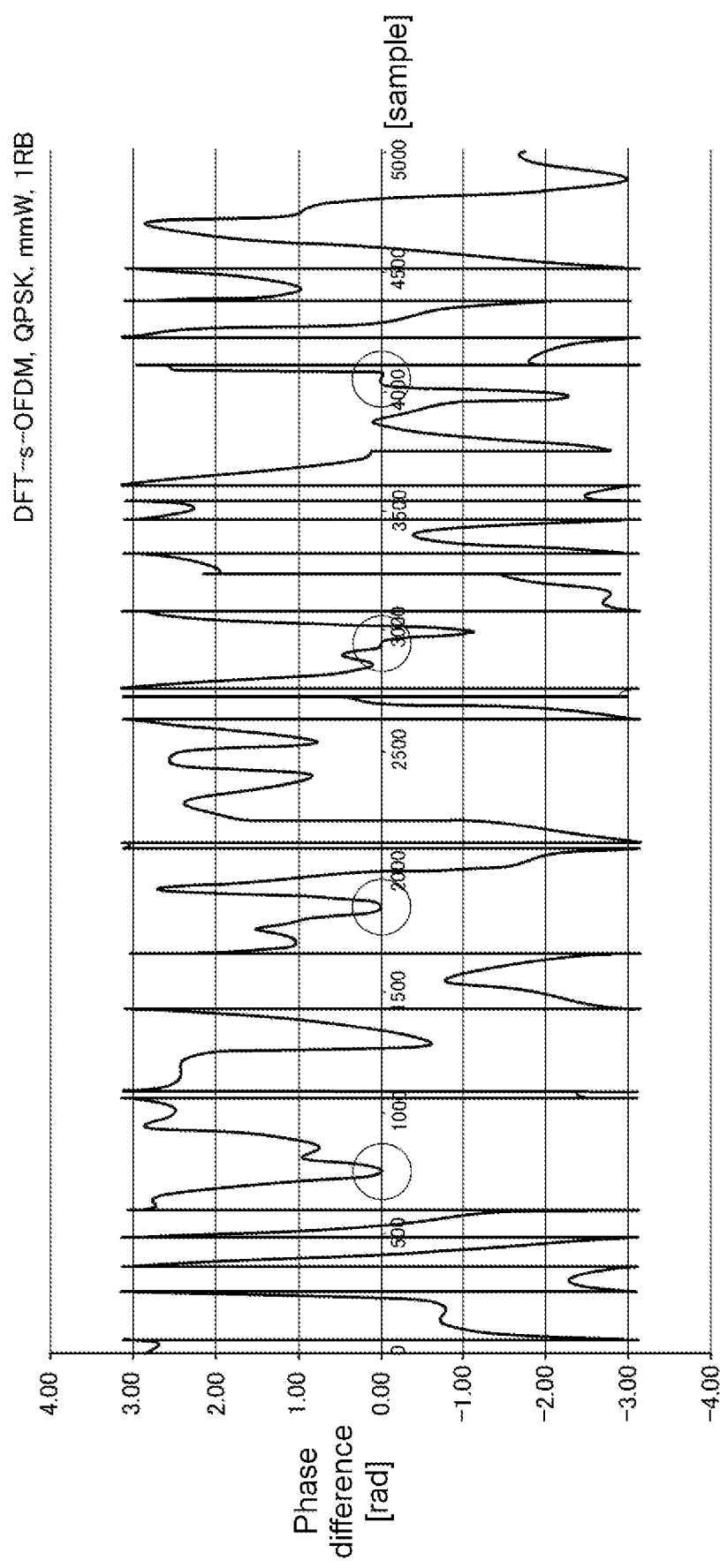
FIG. 10 is a graph of the result of simulating the phase difference when the number of resource blocks is small.

When the number of resource blocks in the symbol is small, the section in which the phase difference becomes constant in the CP' section of the received signal tends to be short (see FIG. 10). Correspondingly, each calculation section may be shorter than the time length of the corresponding CP (for example, 25% of the CP length). Further, instead of calculating the phase difference average for the entire set of calculation sections, the phase difference average is calculated for each calculation section, and the average may be obtained for the remaining phase difference averages excluding the upper and/or lower phase difference averages.

The calculation section storage unit 242 stores information on the calculation section used when the variance calculation unit 24 calculates the variance of the phase difference. Specifically, the calculation section storage unit 242 stores information regarding the section length of each calculation section and the interval between two adjacent calculation sections.

The slide section storage unit 241 stores information on the slide section used when the variance calculation unit 24 calculates the variance of the phase difference. Specifically, the slide section storage unit 241 stores information regarding the section length for sliding the calculation start point on the time axis.

FIG. 7 is a graph illustrating the movement variance of the phase difference calculated by the variance calculation unit 24. The horizontal axis represents the offset value of the calculation start point, from the reference sample point. It can be seen that the phase difference variance value shows a minimum peak, corresponding to the CP' of each symbol in the slot included in the received signal.

The symbol detecting unit 25 detects the position of the minimum peak of the variance on the time axis, from the variance data string n generated by the variance calculation unit 24, and detects the position of the symbol in the slot on the time axis, based on the position of the minimum peak of the variance on the time axis.

As described above, when the short CP and the long CP are mixed in a predetermined order in the slot, the calculation sections having different section lengths are mixed in that order even in the set consisting of a plurality of calculation sections. Therefore, when the calculation start point at the end of the set of calculation sections is at the position corresponding to the first symbol in the slot, the variance of the phase difference shows the minimum peak. Taking advantage of this, the symbol detecting unit 25 can detect the position of the first symbol in the slot on the time axis, based on the position of the minimum peak of the variance on the time axis. The position information p on the first symbol is used by the adjusting unit 26.

The adjusting unit 26 calculates the likelihood that the position of the first symbol, determined from the selected sample points in a time range of a predetermined length, including the calculation start point on the time axis of the calculation section set when the variance is minimal, is the actual position of the first symbol in the received signal, based on the known reference signal in the received signal, and estimates the position of the first symbol from the sample point when the likelihood is maximum. The time range may be, for example, a range of ±2 samples centered on the calculation start point of the calculation section when the variance is minimal.

Specifically, the adjusting unit 26 calculates the correlation value between data on the part of the received signal where the reference signal is to be present and the data on the actual reference signal stored in the reference signal storage unit 261, with the position of the first symbol determined from the sample point selected in the above time range as a reference. The adjusting unit 26 specifies the position of the first symbol from the sample point when the correlation value is maximum. The position information q on the first symbol is sent to the synchronization timing signal generation unit 29.

The reference signal storage unit 261 is disposed at a predetermined position in the slot, and stores data on a reference signal which is a known signal such as a Demodulation Reference Signal (DMRS) or a Phase Tracking Reference Signal (PTRS). The data on the reference signal is used by the adjusting unit 26.

The synchronization timing signal generation unit 29 generates the synchronization timing signal r, based on the information on the position of the symbol in the slot on the time axis. When the symbol detecting unit 25 detects the position of the first symbol in the slot on the time axis, the synchronization timing signal generation unit 29 generates a synchronization timing signal r, based on the information on the position of the first symbol in the slot on the time axis.

A configuration in which the adjusting unit 26 and the reference signal storage unit 261 are omitted is also conceivable. In this case, the synchronization timing signal generation unit 29 generates the synchronization timing signal r, based on the position information p on the time axis on the symbol or the first symbol in the slot detected by the symbol detecting unit 25.

The operation unit 70 is operated by the user to set parameters such as measurement items and measurement conditions for measuring the DUT 2, and determination conditions, and examples thereof include a touch panel, a keyboard composed of hardware keys, an input device such as a dial or a mouse, and a control circuit for controlling these.

The control unit 60 receives an input from the operation unit 70, sets various parameters, and controls functional units such as the synchronization timing detecting unit 20, the demodulation unit 30, and the analysis unit 40.

Figure 9:
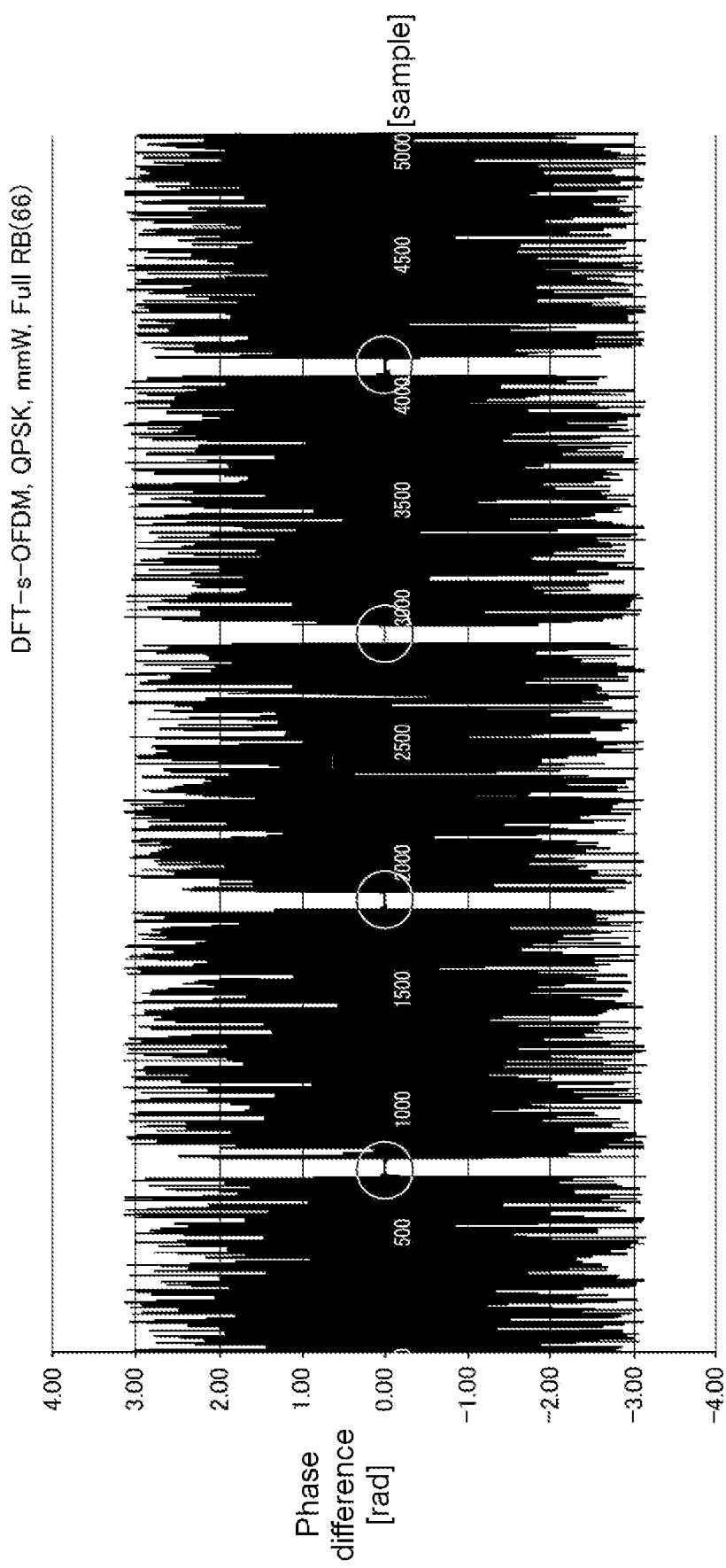
FIG. 9 is a graph of the result of simulating the phase difference when the number of resource blocks is large.

FIG. 9 illustrates a graph obtained by simulating the phase difference when there are many resource blocks (RBs) in the symbol. The simulation was performed under the conditions of DFT-s-OFDM, QPSK, mmW, and Full RB (66). As can be seen from FIG. 9, the beginning of each symbol is clearly recognized, and the phase difference at the tail portion CP' of the symbol is also stable.

FIG. 10 illustrates a graph obtained by simulating the phase difference when there are few resource blocks in the symbol. The simulation was performed under the conditions of DFT-s-OFDM, QPSK, mmW, and 1RB. The portion indicated by the circle corresponds to the tail portion CP' of the symbol. As can be seen from FIG. 10, the section in which the phase difference is constant is shortened.

In the present embodiment, since the first symbol is detected based on the variance of the phase differences in the CP' sections of 14 symbols as well as 1 symbol, the first symbol can be accurately detected even when the number of resource blocks is small.

In general, the phase difference at both ends of the CP' section tends to be unstable, especially when there are few resource blocks. In order to avoid this, the calculation section when the variance shows a minimum peak may not include both ends of the CP' section. For example, each calculation section may have a time length shorter than the time length of the corresponding CP. In this case, the interval between adjacent calculation sections is increased according to the shortened time length of each calculation section. Thus, when the calculation section matches CP', at least one of both ends of CP' can be excluded from the calculation section, so that the peak of variance becomes clearer, and therefore, even when there are few resource blocks, the position of the first symbol can be detected more accurately.

The mobile terminal test apparatus 1 and the receiving device 100 according to the present embodiment include individually or as a whole, computers including, for example, a Central Processing Unit (CPU), a Read Only Memory (ROM), a Random Access Memory (RAM), an input/output interface, a storage device such as a hard disk, and the like. Thus, for example, some or all of the functions of the reception unit 10, the synchronization timing detecting unit 20, the demodulation unit 30, the analysis unit 40, the display unit 50, the control unit 60, the operation unit 70, and the like can be achieved by reading the various processing programs stored in the ROM or the storage device into the RAM and executing the programs in the CPU. For example, the control unit 60 may be a computer.

Figure 11:
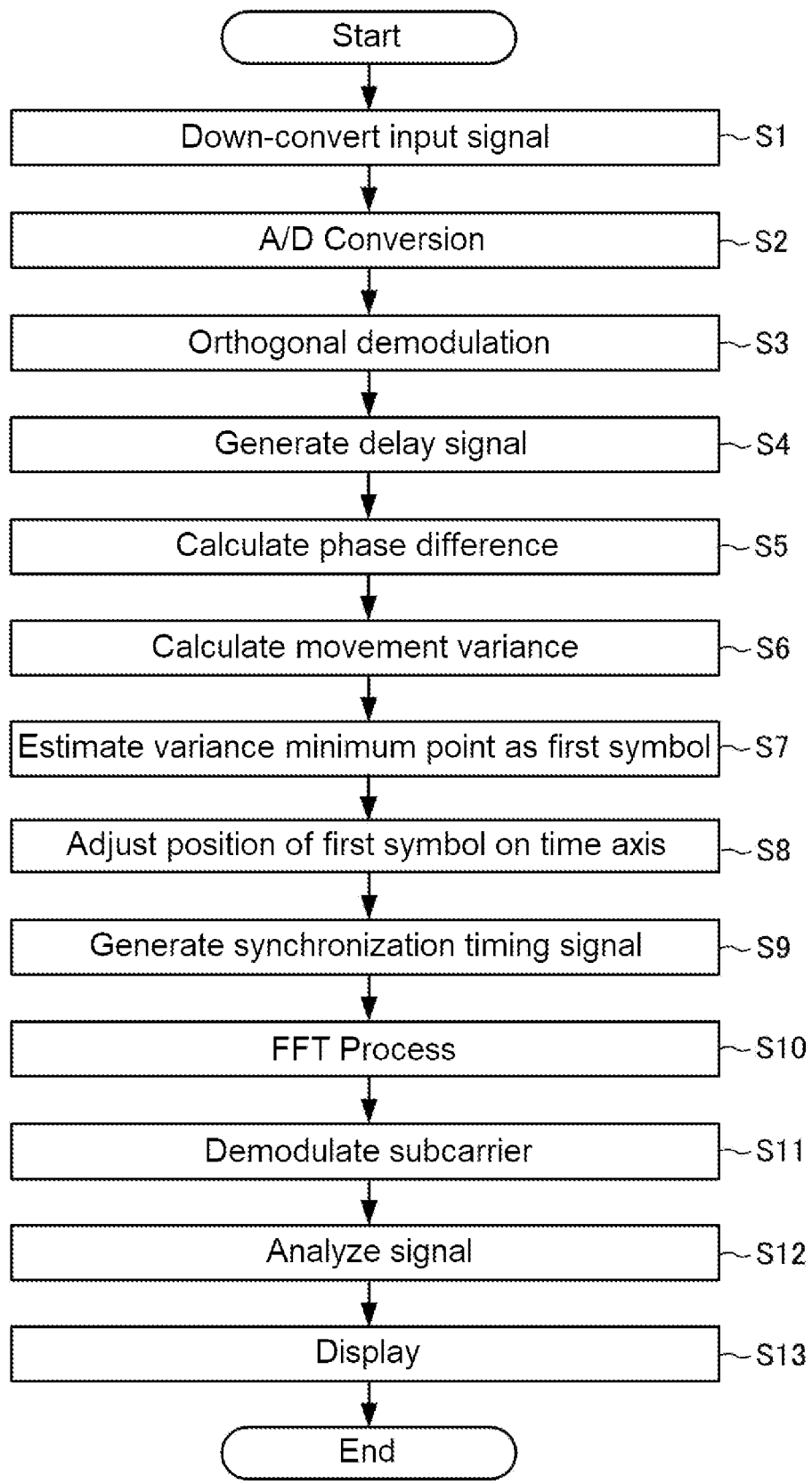
FIG. 11 is a flowchart of a test method according to the first embodiment of the present invention.

Next, a signal analysis method performed using the mobile terminal test apparatus 1 according to the present embodiment will be described with reference to FIGS. 1 and 11.

The DUT 2 transmits a modulation signal a modulated by the OFDM modulation method. A CP is added to the beginning of each symbol included in the modulation signal a.

The reception unit 10 receives the modulation signal a via the antenna or by wire and inputs the modulation signal a to the down converter 11.

The down converter 11 down-converts the modulation signal a transmitted from the DUT 2 into an intermediate frequency signal b having an intermediate frequency (step S1). The intermediate frequency signal b is sent to the ADC 12.

The ADC 12 samples the analog intermediate frequency signal b to generate the digital intermediate frequency signal c (step S2). Sampling is performed, for example, 14640 times, 30720 times, or 61440 times per 14 symbols (1 slot). The digital intermediate frequency signal c is sent to the orthogonal demodulation unit 13.

The orthogonal demodulation unit 13 orthogonally demodulates the digital intermediate frequency signal c sent from the ADC 12 to the baseband signal to generate an orthogonal demodulation signal d (step S3). The orthogonal demodulation signal d is a complex signal in the time domain and has an I-phase component and a Q-phase component. The orthogonal demodulation signal d is sent to the synchronization timing detecting unit 20 and the demodulation unit 30.

In the synchronization timing detecting unit 20, the received signal acquisition unit 21 acquires and stores the orthogonal demodulation signal d as a "received signal" from the orthogonal demodulation unit 13 of the reception unit 10. The received signal d is a complex digital signal having an I-phase component and a Q-phase component. The received signal d is sent to the delay signal generation unit 22 and the difference calculation unit 23.

The delay signal generation unit 22 acquires the I-phase component and the Q-phase component of the received signal d from the received signal acquisition unit 21, delays the received signal by the valid data length of one symbol on the time axis, and generates a delay signal k (step S4). The delay signal k is a complex digital signal having an I-phase component and a Q-phase component. The delay signal k is sent to the difference calculation unit 23.

The difference calculation unit 23 acquires the data string of the received signal d from the received signal acquisition unit 21, acquires the data string of the delay signal k from the delay signal generation unit 22, calculates a phase difference between the received signal d and the delay signal k at each sample point on the time axis, and generate a phase difference data string m (step S5).

The variance calculation unit 24 acquires the phase difference data string m from the difference calculation unit 23, and calculates the variance of the phase difference in the calculation section, by using the information on the calculation section stored in the calculation section storage unit 242 and the information on the slide section stored in the slide section storage unit 241 (step S6).

Specifically, the variance calculation unit 24 calculates the variance of the phase difference in one set of calculation sections 0, 1, . . . , 13 while sliding the calculation start point of the calculation section in the slide section on the time axis. In other words, the variance calculation unit 24 calculates the movement variance of the phase difference. The variance data string n is used in the symbol detecting unit 25.

The symbol detecting unit 25 detects the minimum variance value, based on the variance data string n generated by the variance calculation unit 24, and estimates the position of the first symbol (symbol 0), from the position of the calculation start point on the time axis when the variance value becomes the minimum (step S7). Specifically, for example, when the calculation section has the same time length as the corresponding CP, the symbol detecting unit 25 estimates that the start point of the first symbol in the slot of the received signal d is located at a position which is preceded by the valid data length from a position on the time axis of the calculation start point when the variance value is minimized. The position information p on the first symbol is sent to the adjusting unit 26.

The adjusting unit 26 adjusts the position of the first symbol on the time axis to acquire more accurate position information (step S8).

Specifically, the adjusting unit 26 assumes a time range of a predetermined length including the calculation start point of the calculation section when the variance is minimal, for example, a range of the calculation start point ±2 sample positions. The adjusting unit 26 acquires the data on the portion of the received signal where the reference signal is to be present, with the position of the first symbol determined from the sample points selected from this time range as a reference. For example, when the distance between the first symbol and the reference signal is known, the data on the portion separated from the selected sample position by that distance is acquired. Then, the correlation value between this data and the data on the actual reference signal stored in the reference signal storage unit 261 is calculated. The adjusting unit 26 specifies the position of the first symbol from the sample point when the correlation value is maximum. The position information q on the first symbol acquired by the adjusting unit 26 is used by the synchronization timing signal generation unit 29.

The synchronization timing signal generation unit 29 generates the synchronization timing signal r, based on the position information q on the first symbol (step S9). The synchronization timing signal r is sent to the FFT unit 31 of the demodulation unit 30.

The FFT unit 31 acquires a frequency domain signal e, by performing a fast Fourier transform on the time domain orthogonal demodulation signal d output by the orthogonal demodulation unit 13, according to the synchronization timing signal r sent from the synchronization timing signal generation unit 29 of the synchronization timing detecting unit 20 (step S10). The frequency domain signal e is sent to the subcarrier demodulation unit 32.

The subcarrier demodulation unit 32 performs a demodulation process for each subcarrier from the frequency domain signal e to acquire the OFDM demodulation signal f (step S11). The demodulation process for each subcarrier is a demodulation process corresponding to the modulation method performed for each subcarrier in the DUT 2, and examples thereof include Binary Phase Shift Keying (BPSK), Quadrature Phase Shift Keying (QPSK), 8 Phase Shift Keying (PSK), 16 Quadrature Amplitude Modulation (QAM), 64QAM, and the like.

The analysis unit 40 measures and analyzes, for example, transmission power, EVM, constellation, spectrum, and the like with respect to the OFDM demodulation signal f input from the subcarrier demodulation unit 32 (step S12).

The display unit 50 displays information g such as measurement and analysis result data and graphs obtained by the analysis unit 40 in step S12 (step S13).

Next, the action and effect will be described.

In the receiving device 100 of the present embodiment, the delay signal generation unit 22 generates a delay signal k by delaying the received signal d having a CP at the beginning of each symbol by the valid data length of one symbol on the time axis. The CP of each symbol of the received signal d is a copy of the symbol tail portion (CP'). Therefore, it is expected that the phase difference between the received signal d and the delay signal k becomes almost zero in a section of the symbol tail portion CP' of the received signal d on the time axis, and in the section, the variance of the phase difference between both signals is minimal. Therefore, in the receiving device 100 according to the present embodiment, the position of the symbol is specified by detecting the CP' section in which the variance of the phase difference between the received signal d and the delay signal k is minimal, and the timing signal for synchronization is generated.

Specifically, the variance calculation unit 24 calculates the variance of the difference value within the set of the plurality of calculation sections while sliding the set of the plurality of calculation sections together on the time axis. The plurality of calculation sections included in one set are set corresponding to the CP group assigned to the predetermined symbol group (symbol 0, symbol 1, . . . , and symbol 13) included in the received signal d. For example, each calculation section has the same time length as the time length of the corresponding CP, and the interval between two adjacent calculation sections is equal to the interval between the corresponding adjacent CPs. By calculating the variance of the difference value in a set of a plurality of calculation sections in this way, even when the number of resource blocks in the symbol is small, the minimum peak of the variance appears more clearly. Thus, the position of each symbol of the received signal d on the time axis can be detected accurately, and thus the synchronization timing of the received signal d can be detected accurately. Further, since the variance of the difference value is calculated only in the calculation section of the time length corresponding to each CP, and the variance of the difference value is not calculated in a section between the calculation section and the calculation section (non-calculation section), the calculation amount can be suppressed.

Further, in the receiving device 100 of the present embodiment, the set of a plurality of calculation sections is configured to include a calculation section corresponding to a long CP having a relatively long time length and a calculation section corresponding to a short CP having a relatively short time length. Thus, only when the calculation section having a relatively long time length corresponds to the symbol tail portion (long CP') having a relatively long time length and the calculation section having a relatively short time length corresponds to the symbol tail portion (short CP') having a relatively short time length, the variance of the difference value is minimized. Thus, the receiving device 100 according to the present embodiment can reliably detect the first symbol of the slot (symbol group).

Further, in the receiving device 100 of the present embodiment, the adjusting unit 26 can estimate the more likely position of the first symbol around the position on the time axis of the first symbol detected by the symbol detecting unit 25. At that time, the accuracy of estimation is improved by making a determination based on a known reference signal in the received signal. Specifically, the adjusting unit 26 calculates a correlation value between the data on the signal portion corresponding to the reference signal in the received signal when it is assumed that the sample point selected within the time range is the position of the first symbol in the slot, and the data on the actual reference signal, and estimates the position of the first symbol, from the sample point when the correlation value is the maximum. In this way, the position of the first symbol can be detected more finely by obtaining the position of the first symbol on the time axis in two steps by different methods, whereby the synchronization timing of the received signal can be detected accurately.

Second Embodiment

Next, a mobile terminal test apparatus 1A according to a second embodiment of the present invention will be described with reference to FIGS. 12 and 13, and the like.

Figure 12:
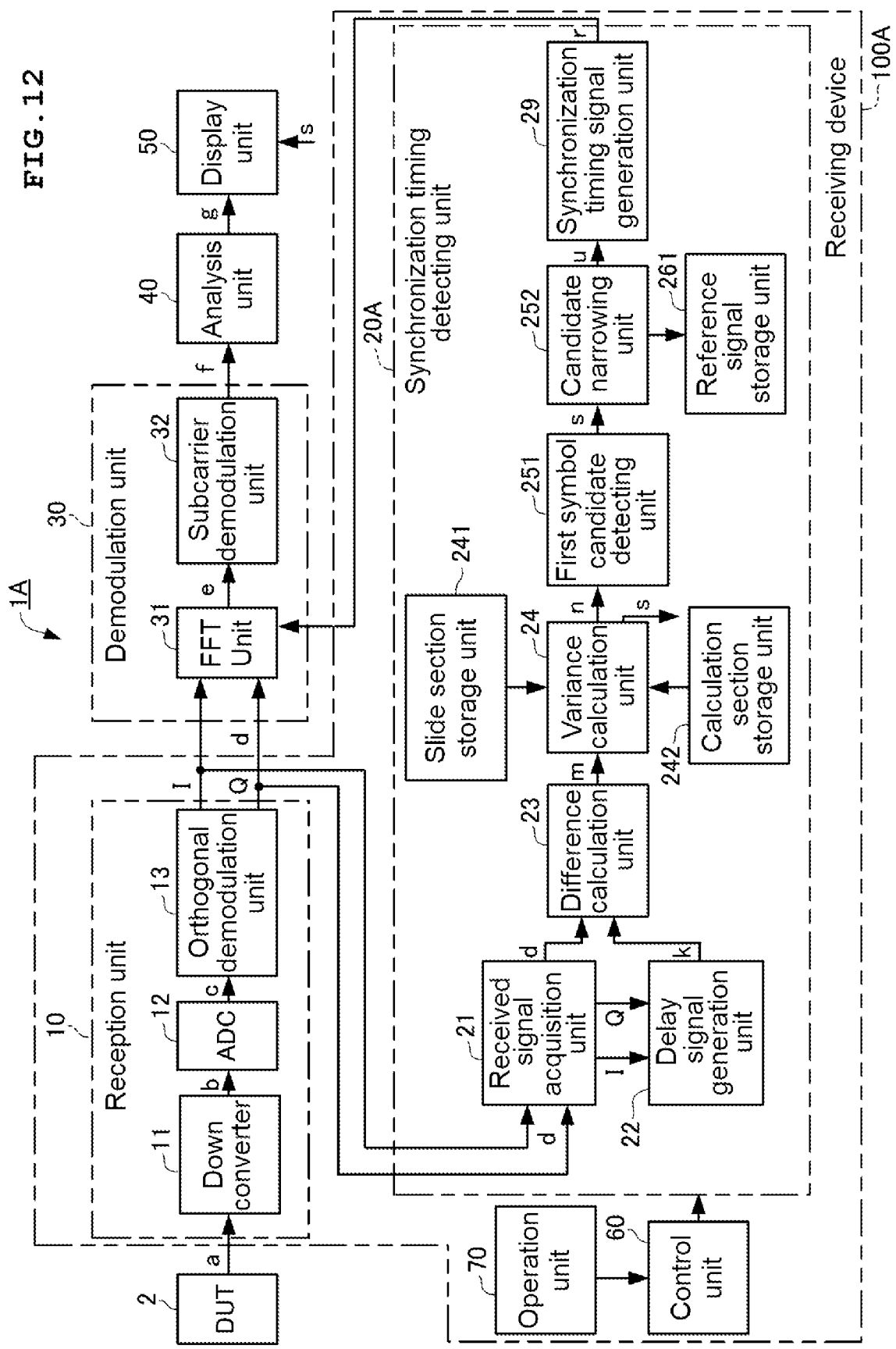
FIG. 12 is a block diagram illustrating a configuration of a mobile terminal test apparatus according to a second embodiment of the present invention.
Figure 13:
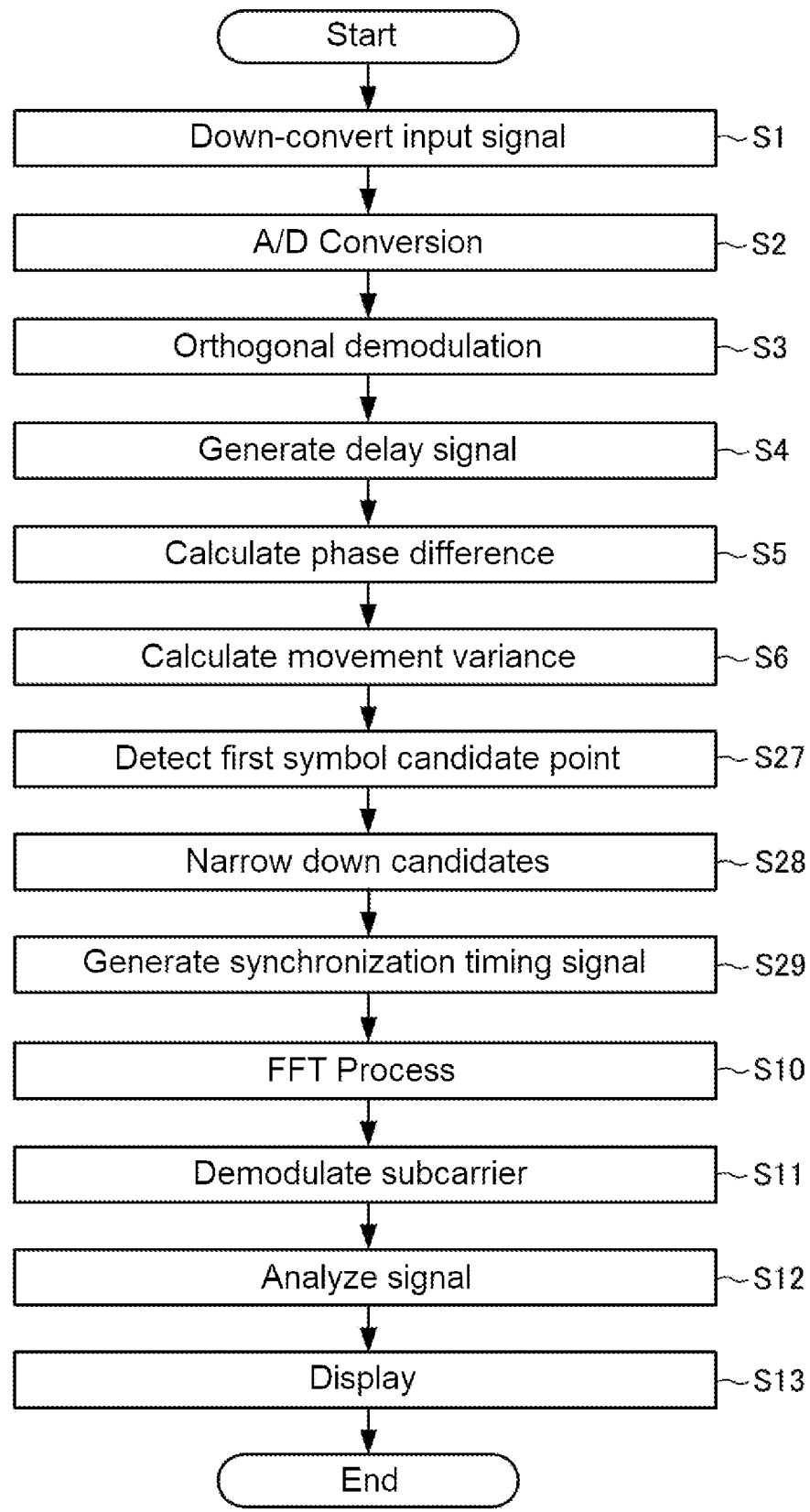
FIG. 13 is a flowchart of a test method according to a second embodiment of the present invention.

As illustrated in FIG. 12, the receiving device 100A of the mobile terminal test apparatus 1A according to the present embodiment differs from the first embodiment in that a first symbol candidate detecting unit 251 and a candidate narrowing unit 252 are added instead of the symbol detecting unit 25 and the adjusting unit 26. Other configurations are the same as the configurations of the first embodiment, the same configurations are designated by the same reference numerals, and detailed description thereof will be omitted as appropriate.

The first symbol candidate detecting unit 251 detects, from the variance data string n generated by the variance calculation unit 24, the calculation start point of the calculation section on the time axis when the variance is smaller than a predetermined reference value, as the first symbol candidate point (step S27). Strictly speaking, the first symbol candidate point corresponds to the start point of the tail portion CP' of the first symbol.

Figure 8:
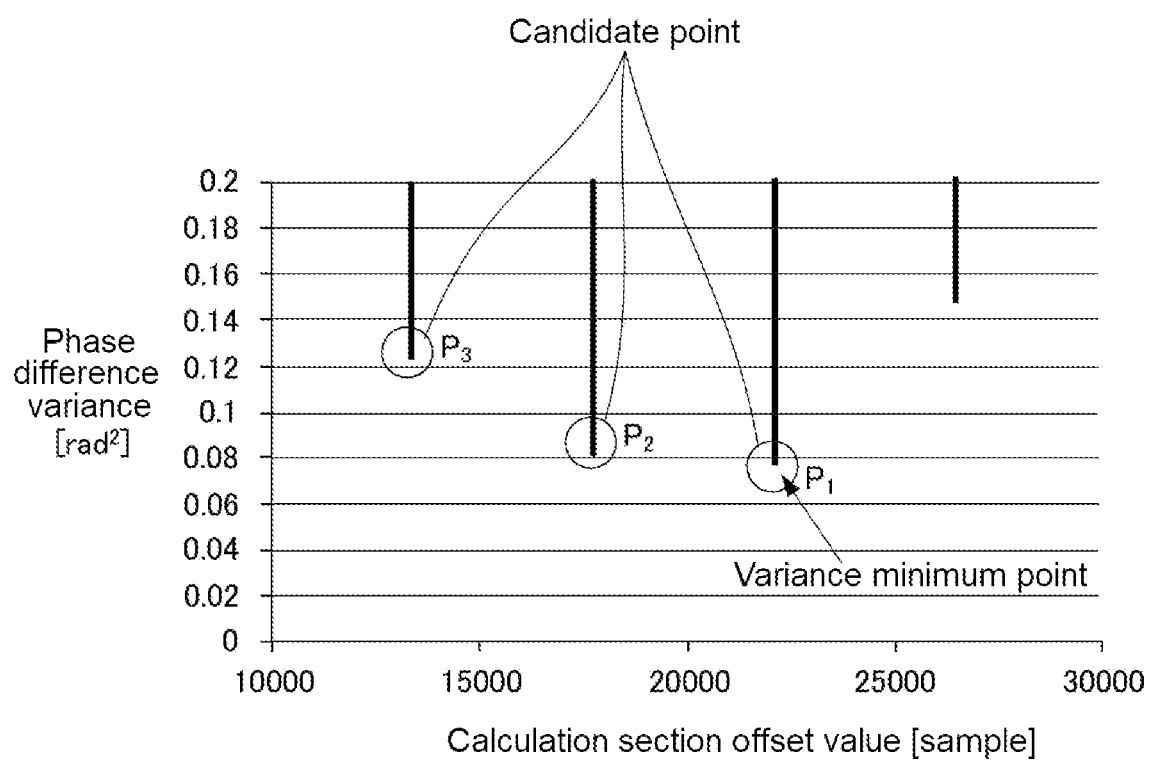
FIG. 8 is a partially enlarged view of the graph of FIG. 6.

For example, in FIG. 7 and FIG. 8 which is an enlarged view of part B of FIG. 7, assuming that the reference value is 0.14 [rad$^2$], three peak points P$_1$, P$_2$, and P$_3$ are the first symbol candidate points. The peak point P$_1$ is the peak having the smallest variance value, the peak point P$_2$ is the peak having the second smallest variance value, and the peak point P$_3$ is the peak having the third smallest variance value. In the first embodiment, the peak point P$_1$ having the smallest variance value is detected and the position of the first symbol on the time axis is specified based on the position, but in the second embodiment, some minimum peaks with lower variance values are set as the first symbol candidate points. The information s on the first symbol candidate point is sent to the candidate narrowing unit 252.

The candidate narrowing unit 252 calculates the likelihood that the position of the first symbol determined from the candidate point of the first symbol is the actual position of the first symbol in the received signal, based on a known reference signal in the received signal, and estimates the position of the first symbol from the first symbol candidate point when the likelihood is maximum (step S28).

Specifically, the candidate narrowing unit 252 calculates a correlation value between data on a part of the received signal where the reference signal is to be present and data on an actual reference signal, with the position of the first symbol determined from the first symbol candidate point as a reference. The candidate narrowing unit 252 specifies the position of the first symbol from the first symbol candidate point when the correlation value is maximum.

With such a configuration, the more likely position of the first symbol, among the first symbol candidate points detected by the first symbol candidate detecting unit 251 can be estimated. At that time, the accuracy of estimation is improved by making a determination based on a known reference signal in the received signal. In the present embodiment, the position of the first symbol can be detected more finely by obtaining the position of the first symbol on the time axis in two steps by different methods, whereby the synchronization timing of the received signal can be detected accurately.

The synchronization timing signal generation unit 29 generates the synchronization timing signal r, based on the position information u on the first symbol narrowed down by the candidate narrowing unit 252 (step S29). The generated synchronization timing signal r is sent to the FFT unit 31.

An adjusting unit 26 similar to the adjusting unit in the first embodiment may be provided between the candidate narrowing unit 252 and the synchronization timing signal generation unit 29 so as to adjust the position of the first symbol narrowed down by the candidate narrowing unit 252 on the time axis to acquire more precise position information.

As described above, the present invention has an effect of being able to accurately detect the synchronization timing of a received signal, and is useful for a receiving device, a receiving method, and a mobile terminal test apparatus provided with the receiving device in general.

DESCRIPTION OF REFERENCE NUMERALS AND SIGNS

1 Mobile terminal test apparatus
2 DUT (mobile communication terminal)
10 Reception unit
11 Down converter
12 ADC
13 Orthogonal demodulation unit
20 Synchronization timing detecting unit
21 Received signal acquisition unit
22 Delay signal generation unit
23 Difference calculation unit
24 Variance calculation unit
241 Slide section storage unit
242 Calculation section storage unit
25 Symbol detecting unit
251 First symbol candidate detecting unit
252 Candidate narrowing unit
26 Adjusting unit
261 Reference signal storage unit
29 Synchronization timing signal generation unit
30 Demodulation unit
31 FFT unit
32 Subcarrier demodulation unit
40 Analysis unit
50 Display unit
60 Control unit
70 Operation unit
100 Receiving device
a Modulation signal
b Intermediate frequency signal
c Digital intermediate frequency signal
d Orthogonal demodulation signal (received signal)
e Frequency domain signal
f OFDM demodulation signal (demodulation signal)
k Delay signal
r Synchronization timing signal

What is claimed is:

1. A receiving device comprising:
a reception unit that acquires a received signal by receiving and sampling a modulation signal modulated by an OFDM method;
a delay signal generation unit that generates a delay signal by delaying the received signal by a valid data length of one symbol on a time axis;
a difference calculation unit that calculates a difference value of physical quantity between the received signal and the delay signal at each sample point on the time axis;
a variance calculation unit that calculates a variance of the difference value within a plurality of calculation sections while sliding a set of the plurality of calculation sections, which are set corresponding to a cyclic prefix group assigned to a predetermined symbol group included in the received signal, together on the time axis;
a symbol detecting unit that detects a position of a symbol in the symbol group on the time axis, based on the position of the minimum peak of the variance on the time axis; and
a synchronization timing signal generation unit that generates a synchronization timing signal, based on information on the position of the symbol on the time axis.

2. The receiving device according to claim 1, wherein
at least one symbol of the symbol group has a cyclic prefix having a longer time length than cyclic prefixes of the other symbols of the symbol group,
a calculation section corresponding to the cyclic prefix having the longer time length has a section length longer than the other calculation sections among the plurality of calculation sections,
the symbol detecting unit detects a position of a first symbol of the symbol group on the time axis, based on a position of the minimum peak of the variance on the time axis, and the synchronization timing signal generation unit generates the synchronization timing signal, based on information on the position of the first symbol on the time axis.

3. The receiving device according to claim 2, further comprising:
an adjusting unit that calculates a likelihood that in a time range of a predetermined length including a calculation start point of the plurality of calculation sections on the time axis when the variance is minimal, a position of the first symbol determined from a selected sample point is an actual position of the first symbol in the received signal, based on a known reference signal in the received signal, and estimates the position of the first symbol from a sample point when the likelihood is maximum.

4. The receiving device according to claim 2, further comprising:
a first symbol candidate detecting unit that detects a calculation start point of the plurality of calculation sections on the time axis when the variance is smaller than a predetermined reference value, as a first symbol candidate point; and
a candidate narrowing unit that calculates a likelihood that a position of the first symbol determined from the first symbol candidate point is an actual position of the first symbol in the received signal, based on a known reference signal in the received signal, and estimates the position of the first symbol from the first symbol candidate point when the likelihood is maximum.

5. The receiving device according to claim 1, wherein each calculation section has a time length shorter than a time length of the corresponding cyclic prefix.

6. The receiving device according to claim 2, wherein each calculation section has a time length shorter than a time length of the corresponding cyclic prefix.

7. The receiving device according to claim 3, wherein each calculation section has a time length shorter than a time length of the corresponding cyclic prefix.

8. The receiving device according to claim 4, wherein each calculation section has a time length shorter than a time length of the corresponding cyclic prefix.

9. A mobile terminal test apparatus comprising:
a receiving device including
a reception unit that acquires a received signal by receiving a modulation signal modulated by an OFDM method from a mobile communication terminal and sampling the modulation signal,
a delay signal generation unit that generates a delay signal by delaying the received signal by a valid data length of one symbol on a time axis,
a difference calculation unit that calculates a difference value of physical quantity between the received signal and the delay signal at each sample point on the time axis,
a variance calculation unit that calculates a variance of the difference value within a plurality of calculation sections while sliding a set of the plurality of calculation sections which are set corresponding to a cyclic prefix group assigned to a predetermined symbol group included in the received signal, together on the time axis,
a symbol detecting unit that detects a position of a symbol in the symbol group on the time axis, based on the position of the minimum peak of the variance on the time axis, and a synchronization timing signal generation unit that generates a synchronization timing signal, based on information on the position of the symbol on the time axis;
a demodulation unit that demodulates the received signal, based on the synchronization timing signal, and outputs a demodulation signal;
an analysis unit that analyzes the demodulation signal; and
a display unit that displays a result of the analysis performed by the analysis unit.

10. The mobile terminal test apparatus according to claim 9, wherein
at least one symbol of the symbol group has a cyclic prefix having a longer time length than cyclic prefixes of the other symbols of the symbol group,
a calculation section corresponding to the cyclic prefix having the longer time length has a section length longer than the other calculation sections among the plurality of calculation sections,
the symbol detecting unit detects a position of a first symbol of the symbol group on the time axis, based on the position of the minimum peak of the variance on the time axis, and
the synchronization timing signal generation unit generates a synchronization timing signal, based on information on the position of the first symbol on the time axis.

11. The mobile terminal test apparatus according to claim 9, further comprising:
an adjusting unit that calculates a likelihood that in a time range of a predetermined length including a calculation start point of the plurality of calculation sections on the time axis when the variance is minimal, a position of the first symbol determined from a selected sample point is an actual position of the first symbol in the received signal, based on a known reference signal in the received signal, and estimates the position of the first symbol from a sample point when the likelihood is maximum.

12. The mobile terminal test apparatus according to claim 9, further comprising:
a first symbol candidate detecting unit that detects a calculation start point of the plurality of calculation sections on the time axis when the variance is smaller than a predetermined reference value, as a first symbol candidate point; and
a candidate narrowing unit that calculates a likelihood that a position of the first symbol determined from the first symbol candidate point is an actual position of the first symbol in the received signal, based on a known reference signal in the received signal, and estimates the position of the first symbol from the first symbol candidate point when the likelihood is maximum.

13. The mobile terminal test apparatus according to claim 9, wherein
each calculation section has a time length shorter than a time length of the corresponding cyclic prefix.

14. The mobile terminal test apparatus according to claim 9, wherein
the physical quantity is a phase,
when calculating a variance of a phase difference within the plurality of calculation sections, the variance calculation unit calculates an average value of the phase difference within the plurality of calculation sections, and calculates a frequency error of the received signal from an average value of the phase difference when the variance indicates the minimum peak, and the display unit displays information on the frequency error.

15. A receiving method comprising:
a reception step of acquiring a received signal by receiving and sampling a modulation signal modulated by an OFDM method;
a delay signal generation step of generating a delay signal by delaying the received signal by a valid data length of one symbol on a time axis;
a difference calculation step of calculating a difference value of physical quantity between the received signal and the delay signal at each sample point on the time axis;
a variance calculation step of calculating a variance of the difference value within a plurality of calculation sections, while sliding a set of the plurality of calculation sections which are set corresponding to a cyclic prefix group assigned to a predetermined symbol group included in the received signal, together on the time axis;
a symbol detection step of detecting a position of each symbol in the symbol group on the time axis, based on the position of the minimum peak of the variance on the time axis; and
a synchronization timing signal generation step of generating a synchronization timing signal, based on information on the position of the each symbol on the time axis.

* * * * *